(12) United States Patent
Mercuri et al.

(10) Patent No.: US 6,528,199 B1
(45) Date of Patent: Mar. 4, 2003

(54) GRAPHITE ARTICLE USEFUL AS AN ELECTRODE FOR AN ELECTROCHEMICAL FUEL CELL

(75) Inventors: Robert Angelo Mercuri, Seven Hills, OH (US); Thomas William Weber, Cleveland, OH (US); Michael Lee Warddrip, Parma, OH (US)

(73) Assignee: Graftech Inc., Lakewood, OH (US)

( * ) Notice: Subject to any disclaimer, the term of this patent is extended or adjusted under 35 U.S.C. 154(b) by 0 days.

(21) Appl. No.: 09/549,865

(22) Filed: Apr. 14, 2000

(51) Int. Cl.[7] .................................................. H01M 4/96
(52) U.S. Cl. .............................. 429/40; 429/34; 429/36; 429/38; 429/39; 429/44; 313/326
(58) Field of Search .............................. 429/34, 36, 38, 429/39, 40, 44; 313/326

(56) References Cited

U.S. PATENT DOCUMENTS

| | | | |
|---|---|---|---|
| 3,404,061 A | 10/1968 | Shane et al. ................. 161/125 |
| 4,649,091 A | 3/1987 | McElroy ....................... 429/34 |
| 4,895,713 A | 1/1990 | Greinke et al. .............. 423/448 |
| 4,988,583 A | 1/1991 | Watkins et al. ................ 429/30 |
| 5,300,370 A | 4/1994 | Washington ................... 429/34 |
| 5,521,018 A | 5/1996 | Wilkinson et al. .............. 42/26 |
| 5,885,728 A | 3/1999 | Mercuri et al. ................ 429/30 |
| 5,902,762 A | 5/1999 | Mercuri et al. ................ 501/99 |
| 5,976,726 A | 11/1999 | Wilkinson et al. ............. 429/35 |
| 6,037,074 A | 3/2000 | Mercuri et al. ................ 429/34 |
| 6,210,652 B1 * | 4/2001 | Bou et al. .................... 423/659 |
| 6,242,124 B1 * | 6/2001 | Saito et al. .................... 429/38 |

OTHER PUBLICATIONS

WO 01/15257—International Application No. PCT/US00/21641, Filed: Aug. 8, 2000.

* cited by examiner

*Primary Examiner*—Carol Chaney
*Assistant Examiner*—Dah-Wei D. Yuan
(74) *Attorney, Agent, or Firm*—James R. Cartiglia

(57) ABSTRACT

A graphite article in the form of a flexible graphite sheet having transverse fluid channels passing through the sheet and a groove formed in one of the surfaces of the sheet communicating with a plurality of the transverse fluid channels is presented.

10 Claims, 10 Drawing Sheets

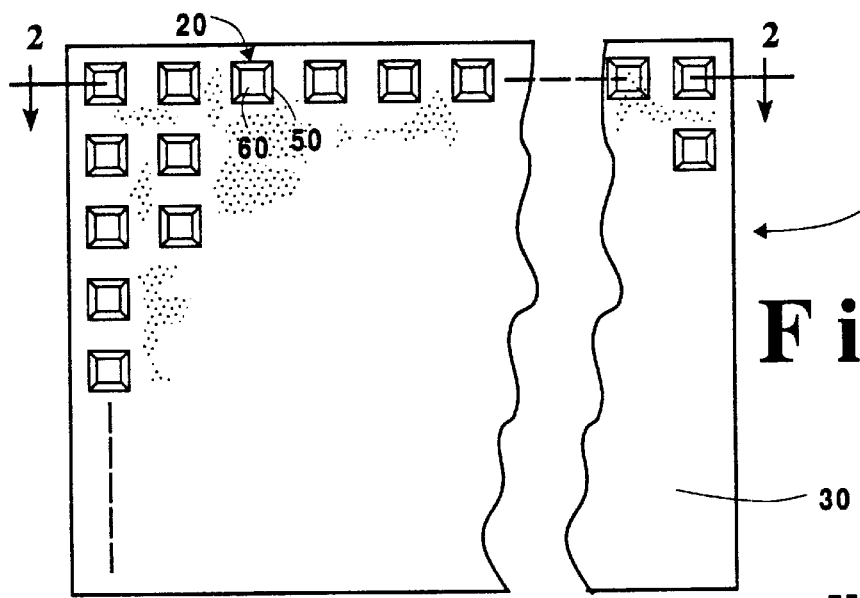
Fig. 1
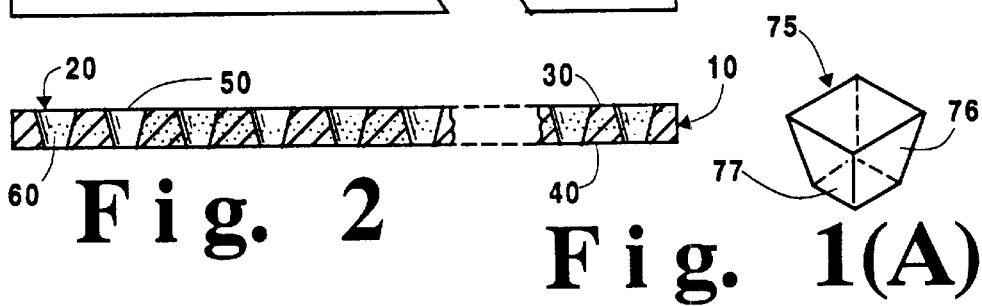
Fig. 2
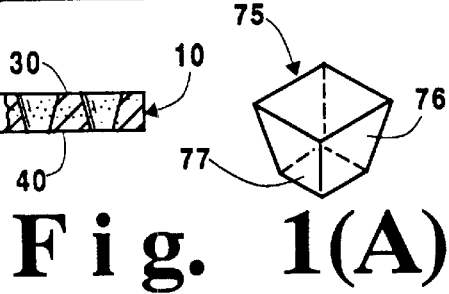
Fig. 1(A)
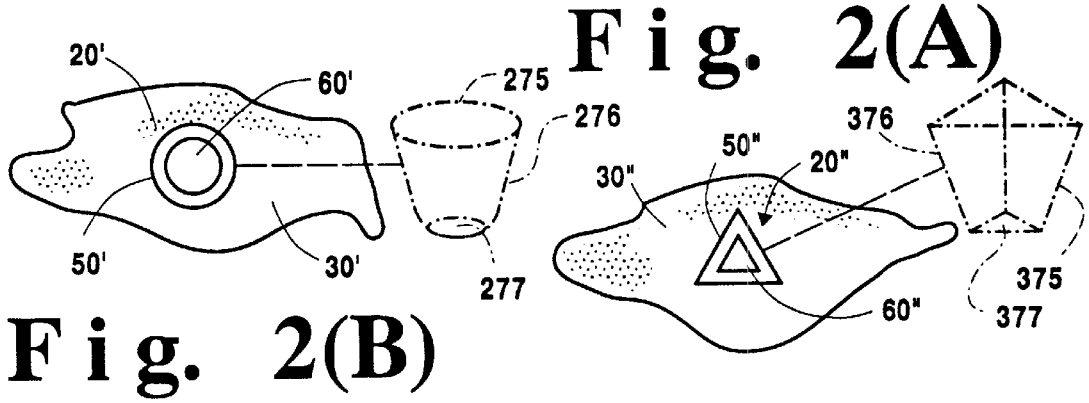
Fig. 2(A)
Fig. 2(B)
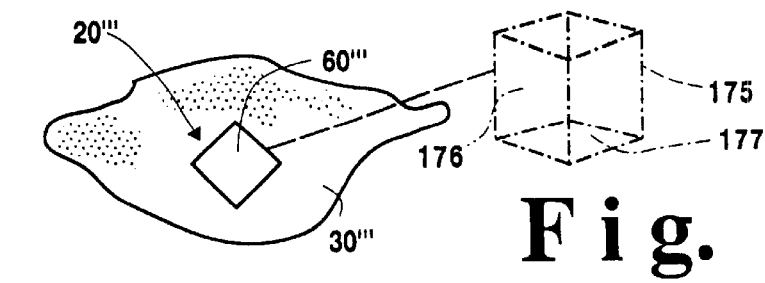
Fig. 2(C)

GRAPHITE ARTICLE USEFUL AS AN ELECTRODE FOR AN ELECTROCHEMICAL FUEL CELL

TECHNICAL FIELD

The present invention relates to an article formed of a grooved flexible graphite sheet which is fluid permeable in the transverse direction and has enhanced isotropy with respect to thermal and electrical conductivity. The article of the present invention is useful as a gas diffusing electrode in an electrochemical fuel cell.

BACKGROUND OF THE INVENTION

Graphites are made up of layer planes of hexagonal arrays or networks of carbon atoms. These layer planes of hexagonally arranged carbon atoms are substantially flat and are oriented or ordered so as to be substantially parallel and equidistant to one another. The substantially flat, parallel equidistant sheets or layers of carbon atoms, usually referred to as basal planes, are linked or bonded together and groups thereof are arranged in crystallites. Highly ordered graphites consist of crystallites of considerable size: the crystallites being highly aligned or oriented with respect to each other and having well ordered carbon layers. In other words, highly ordered graphites have a high degree of preferred crystallite orientation. Graphites exhibit anisotropy because of their inherent structures and thus exhibit or possess many properties, like thermal and electrical conductivity and fluid diffusion, that are highly directional. Briefly, graphites may be characterized as laminated structures of carbon, that is, structures consisting of superposed layers or laminae of carbon atoms joined together by weak van der Waals forces. In considering the graphite structure, two axes or directions are usually noted, to wit, the "c" axis or direction and the "a" axes or directions. For simplicity, the "c" axis or direction may be considered as the direction perpendicular to the carbon layers. The "a" axes or directions may be considered as the directions parallel to the carbon layers or the directions perpendicular to the "c" direction. The natural graphites most suitable for manufacturing flexible graphite possess a very high degree of orientation.

As noted above, the bonding forces holding the parallel layers of carbon atoms together are only weak van der Waals forces. Graphites can be treated so that the spacing between the superposed carbon layers or laminae can be appreciably opened up so as to provide a marked expansion in the direction perpendicular to the layers, that is, in the "c" direction and thus form an expanded or intumesced graphite structure in which the laminar character of the carbon layers is substantially retained.

Natural graphite flake which has been expanded and more particularly expanded so as to have a final thickness or "c" direction dimension which is at least about 80 or more times the original "c" direction dimension can be formed without the use of a binder into cohesive or integrated flexible graphite sheets of expanded graphite, e.g. webs, papers, strips, tapes, or the like. The formation of graphite particles which have been expanded to have a final thickness or "c" dimension which is at least about 80 times the original "c" direction dimension into integrated flexible sheets by compression, without the use of any binding material is believed to be possible due to the excellent mechanical interlocking, or cohesion which is achieved between the voluminously expanded graphite particles.

In addition to flexibility, the sheet material, as noted above, has also been found to possess a high degree of anisotropy with respect to thermal and electrical conductivity and fluid diffusion, comparable to the natural graphite starting material due to orientation of the expanded graphite particles substantially parallel to the opposed faces of the sheet resulting from very high compression, e.g., roll pressing. Sheet material thus produced has excellent flexibility, good strength and a very high degree of orientation.

Briefly, the process of producing flexible, binderless anisotropic graphite sheet material, such as web, paper, strip, tape, foil, mat, or the like, comprises compressing or compacting under a predetermined load and in the absence of a binder, expanded graphite particles which have a "c" direction dimension which is at least about 80 times that of the original particles so as to form a substantially flat, flexible, integrated graphite sheet. The expanded graphite particles, which generally are worm-like or vermiform in appearance, once compressed, will maintain the compression set and alignment with the opposed major surfaces of the sheet. The density and thickness of the sheet material can be varied by controlling the degree of compression. The density of the sheet material can be within the range of from about 5 pounds per cubic foot to about 125 pounds per cubic foot. The flexible graphite sheet material exhibits an appreciable degree of anisotropy due to the alignment of graphite particles parallel to the major opposed, parallel surfaces of the sheet, with the degree of anisotropy increasing upon roll pressing of the sheet material to increased density. In roll pressed anisotropic sheet material, the thickness, i.e. the direction perpendicular to the opposed, parallel sheet surfaces comprises the "c" direction and the directions ranging along the length and width, i.e. along or parallel to the opposed, major surfaces comprises the "a" directions and the thermal, electrical and fluid diffusion properties of the sheet are very different, by orders of magnitude, for the "c" and "a" directions.

This very considerable difference in properties, which is directionally dependent, can be disadvantageous in some applications. For example, in gasket applications where flexible graphite sheet is used as the gasket material and in use is held tightly between metal surfaces, the diffusion of fluid like gases or liquids occurs more readily parallel to and between the major surfaces of the flexible graphite sheet. It would, in most instances, provide for improved gasket performance if the resistance to fluid flow parallel to the major surfaces of the graphite sheet ("a" direction) were increased, even at the expense of reduced resistance to fluid diffusion flow transverse to the major faces of the graphite sheet ("c" direction). With respect to electrical properties, the resistivity of anisotropic flexible graphite sheet is high in the direction transverse to the major surfaces ("c" direction) of the flexible graphite sheet, and very substantially less in the direction parallel to and between the major faces of the flexible graphite sheet ("a" direction). In applications such as fuel cells, it would be of advantage if the electrical resistance transverse to the major surfaces of the flexible graphite sheet ("c" direction) were decreased, even at the expense of an increase in electrical resistivity in the direction parallel to the major faces of the flexible graphite sheet ("a" direction).

The foregoing situations are accommodated by the present invention.

SUMMARY OF THE INVENTION

In accordance with the present invention, a graphite article is provided, comprising a compressed mass of expanded graphite particles in the form of a sheet having opposed first and second major surfaces with transverse fluid channels passing through the sheet between the first and second surfaces, with at least one of the surfaces having an open top groove interconnecting with a plurality of the transverse fluid channels. The transverse fluid channels passing through the sheet between the opposed first and second surfaces are advantageously formed by mechanically impacting a surface of the sheet to displace graphite within the sheet at a plurality of predetermined locations to provide the channels with openings at the first and second opposed surfaces. In a particular embodiment, the transverse channel openings at one of the parallel opposed surfaces are smaller than their respective openings at the other opposed surface whereby pressurized fluid in contact with the opposed surface having the smaller channel openings enters the respective channels at an initial velocity which is greater than the velocity of the fluid exiting the respective channels, i.e., the gas exit velocity is slowed. Likewise, pressurized fluid in contact with the opposed surface having the larger channel openings has higher gas exit velocity. The transversely channelled sheet is further mechanically impacted at one of its opposed surfaces, to displace graphite within the sheet and provide in the surface of the article a preferably continuous open top groove which interconnects with a plurality of the transverse fluid channels. The mechanical impacting can be suitably accomplished by molding, pressing and embossing. An open top groove can also be provided by engraving and etching techniques.

The article of the present invention is useful as a fluid permeable e.g. gas diffusing electrode having an integral gas diffusing element. In accordance with the present invention, a cover element for the grooved surface is provided in the form of roll-pressed and calendered anisotropic flexible graphite sheet which enhances heat transfer performance of the gas diffusing electrode in electrochemical fuel cells as hereinafter described.

BRIEF DESCRIPTION OF THE DRAWINGS

FIG. 1 is a plan view of a transversely permeable sheet of flexible graphite having transverse channels in accordance with the present invention;

FIG. 1(A) shows a flat-ended protrusion element used in making the channels in the perforated sheet of FIG. 1;

FIG. 2 is a side elevation view in section of the sheet of FIG. 1;

FIGS. 2(A), (B), (C) show various suitable flat-ended configurations for transverse channels in accordance with the present invention;

FIG. 6(A) is a sectional side elevation view of the material of FIG. 6;

FIG. 6(B) is a sectional side elevation view of material of FIG. 1 having a continuous open-top groove in its bottom surface in accordance with the present invention;

FIGS. 9, 10 and 10(A) show a fluid permeable electrode assembly which includes the article of FIG. 6 in accordance with the present invention;

DETAILED DESCRIPTION OF THE INVENTION

Figure 3:
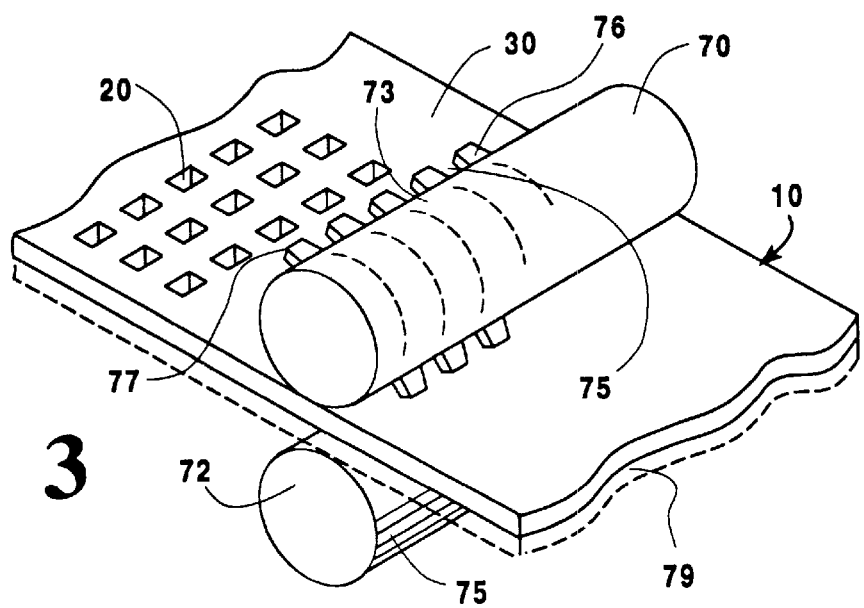
FIGS. 3, 3(A) shows a mechanism for making the article of FIG. 1.
Figure 3A:
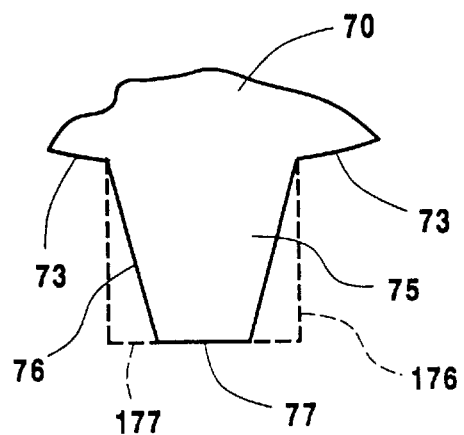

Graphite is a crystalline form of carbon comprising atoms covalently bonded in flat layered planes with weaker bonds between the planes. By treating particles of graphite, such as natural graphite flake, with an intercalant of, e.g. a solution of sulfuric and nitric acid, the crystal structure of the graphite reacts to form a compound of graphite and the intercalant. The treated particles of graphite are hereafter referred to as "particles of intercalated graphite." Upon exposure to high temperature, the particles of intercalated graphite expand in dimension, often as much as about 80 or more times their original volume in an accordion-like fashion in the "c" direction, i.e. in the direction perpendicular to the crystalline planes of the graphite. The exfoliated graphite particles are vermiform in appearance, and are therefore commonly referred to as worms. The worms may be compressed together into flexible sheets that, unlike the original graphite flakes, can be formed and cut into various shapes and provided with small transverse openings by deforming mechanical impact.

A common method for manufacturing graphite sheet, e.g. foil from flexible graphite is described by Shane et aL in U.S. Pat. No. 3,404,061 the disclosure of which is incorporated herein by reference. In the typical practice of the Shane et al. method, natural graphite flakes are intercalated by dispersing the flakes in a solution containing an oxidizing agent of, e.g. a mixture of nitric and sulfuric acid. The intercalation solution contains oxidizing and other intercalating agents known in the art. Examples include those containing oxidizing agents and oxidizing mixtures, such as solutions containing nitric acid, potassium chlorate, chromic acid, potassium permanganate, potassium chromate, potassium dichromate, perchloric acid, and the like, or mixtures, such as for example, concentrated nitric acid and chlorate, chromic acid and phosphoric acid, sulfuric acid and nitric acid, or mixtures of a strong organic acid, e.g. trifluoroacetic acid, and a strong oxidizing agent soluble in the organic acid.

In a preferred embodiment, the intercalating agent is a solution of a mixture of sulfuric acid, or sulfuric acid and phosphoric acid, and an oxidizing agent, i.e. nitric acid, perchloric acid, chromic acid, potassium permanganate, hydrogen peroxide, iodic or periodic acids, or the like. Although less preferred, the intercalation solutions may contain metal halides such as ferric chloride, and ferric chloride mixed with sulfuric acid, or a halide, such as bromine as a solution of bromine and sulfuric acid or bromine in an organic solvent.

After the flakes are intercalated, any excess solution is drained from the flakes and the flakes are water-washed. The quantity of intercalation solution retained on the flakes after draining may range from 20 to 150 parts of solution by weight per 100 parts by weight of graphite flakes (pph) and more typically about 50 to 120 pph. Alternatively, the quantity of the intercalation solution may be limited to between 10 to 50 parts of solution per hundred parts of graphite by weight (pph) which permits the washing step to be eliminated as taught and described in U.S. Pat. No. 4,895,713, the disclosure of which is also herein incorporated by reference. Upon exposure to high temperature, e.g. about 700° C. to 1000° C. and higher, the particles of intercalated graphite expand as much as about 80 to 1000 or more times their original volume in an accordion-like fashion in the c-direction, i.e., in the direction perpendicular to the crystalline planes of the constituent graphite particles. The resulting worms may be compressed together into flexible sheets and provided with small transverse openings by deforming mechanical impact as hereinafter described.

Flexible graphite sheet and foil are coherent, with good handling strength, and are suitably compressed, such as by roll-pressing, to a thickness of 0.003 to 0.15 inch and a density of 0.1 to 1.5 grams per cubic centimeter. From about 1.5–30% by weight of ceramic additives, can be blended with the intercalated graphite flakes as described in U.S. Pat. No. 5,902,762 (which is incorporated herein by reference) to provide enhanced resin impregnation in the final flexible graphite product. The additives include ceramic fiber particles having a length of 0.15 to 1.5 millimeters. The width of the particles is suitably from 0.04 to 0.004 mm. The ceramic fiber particles are non-reactive and non-adhering to graphite and are stable at temperatures up to 2000° F., preferably 2500° F. Suitable ceramic fiber particles are formed of macerated quartz glass fibers, carbon and graphite fibers, zirconia, boron nitride, silicon carbide and magnesia fibers, naturally occurring mineral fibers such as calcium metasilicate fibers, calcium aluminum silicate fibers, aluminum oxide fibers and the like.

With reference to FIG. 1 and FIG. 2, a compressed mass of expanded graphite particles, in the form of a flexible graphite sheet is shown at 10. The flexible graphite sheet 10 is provided with channels 20, which are preferably smooth-sided as indicated at 67 in FIGS. 5 and 8, and which pass between the parallel, opposed surfaces 30, 40 of flexible graphite sheet 10. The channels 20 preferably have openings 50 on one of the opposed surfaces 30 which are larger than the openings 60 in the other opposed surface 40. The channels 20 can have different configurations as shown at 20'–20''' in FIGS. 2(A), 2(B), 2(C) which are formed using flat-ended protrusion elements of different shapes as shown at 75, 175, 275, 375 in FIGS. 1(A) and 2(A), 2(B), 2(C), suitably formed of metal like steel and integral with and extending from the pressing roller 70 of the impacting device shown in FIG. 3. The smooth flat-ends of the protrusion elements, shown at 77, 177, 277, 377, and the smooth bearing surface 73, of roller 70, and the smooth bearing surface 78 of roller 72 (or alternatively flat metal plate 79), ensure deformation and displacement of graphite within the flexible graphite sheet, i.e. there are preferably no rough or ragged edges or debris resulting from the channel-forming impact. Preferred protrusion elements have decreasing cross-section in the direction away from the pressing roller 70 to provide larger channel openings on the side of the sheet that is initially impacted. The development of smooth, unobstructed surfaces 63 surrounding channel openings 60, enables the free flow of fluid into and through smooth-sided (at 67) channels 20.

Figure 4:
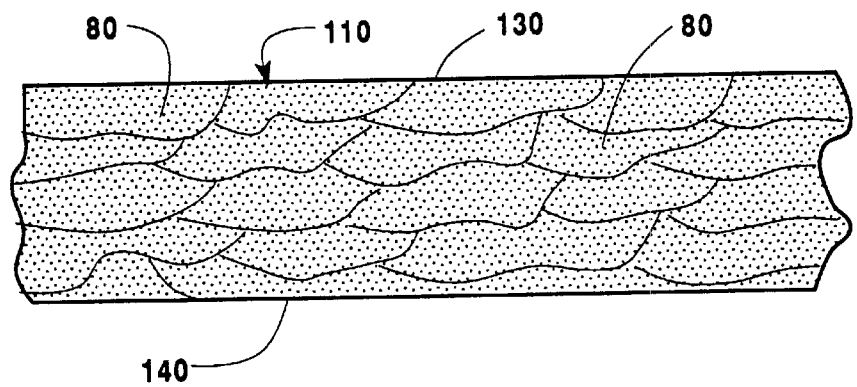
FIG. 4 shows an enlarged sketch of an elevation view of oriented expanded graphite particles of flexible graphite sheet material.
Figure 5:
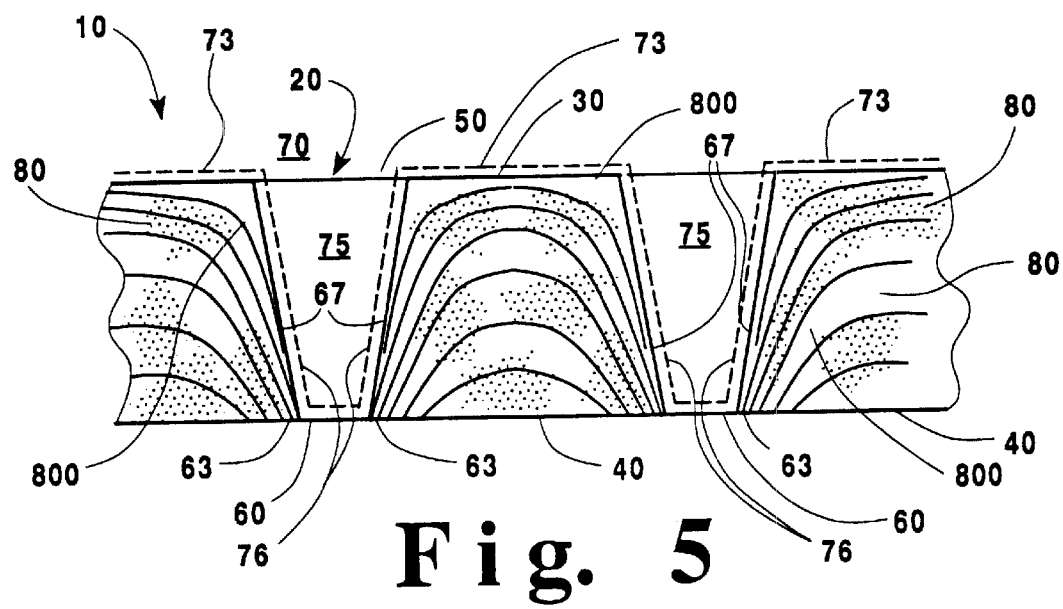
FIG. 5 is a sketch of an enlarged elevation view of an article formed of flexible graphite sheet having transverse channels for use with the present invention.

In a preferred embodiment, openings one of the opposed surfaces are larger than the channel openings in the other opposed surface, e.g., from 1 to 200 times greater in area, and result from the use of protrusion elements having converging sides such as shown at 76, 276, 376. The channels 20 are formed in the flexible graphite sheet 10 at a plurality of pre-determined locations by mechanical impact at the predetermined locations in sheet 10 using a mechanism such as shown in FIG. 3 comprising a pair of steel rollers 70, 72 with one of the rollers having truncated, i.e., flat-ended, prism-shaped protrusions 75 which impact surface 30 of flexible graphite sheet 10 to displace graphite and penetrate sheet 10 to form open channels 20. In practice, both rollers 70, 72 can be provided with "out-of-register" protrusions, and a flat metal plate indicated at 79, can be used in place of smooth-surfaced roller 72. FIG. 4 is an enlarged sketch of a sheet of flexible graphite 110 that shows a typical orientation of compressed expanded graphite particles 80 substantially parallel to the opposed surfaces 130, 140. This orientation of the expanded graphite particles 80 results in anisotropic properties in flexible graphite sheets, the electrical conductivity and thermal conductivity of the sheet being substantially lower in the direction transverse to opposed surfaces 130, 140 ("c" direction) than in the direction ("a" direction) parallel to opposed surfaces 130, 140. In the course of impacting flexible graphite sheet 10 to form channels 20, as illustrated in FIG. 3, graphite is displaced within flexible graphite sheet 10 by flat-ended (at 77) protrusions 75 to push aside graphite as it travels to and bears against smooth surface 73 of roller 70 to disrupt and deform the parallel orientation of expanded graphite particles 80 as shown at 800 in FIG. 5. This region 800 of adjacent channels 20 shows disruption of the parallel orientation into an oblique, non-parallel orientation and is optically observable at magnifications of 100× and higher. In effect the displaced graphite is being "die-molded" by the sides 76 of adjacent protrusions 75 and the smooth surface 73 of roller 70 as illustrated in FIG. 5. This reduces the anisotropy in flexible graphite sheet 10 and thus increases the electrical and thermal conductivity of sheet 10 in the direction transverse to the opposed surfaces 30, 40. A similar effect is achieved with frusto-conical and parallel-sided peg-shaped flat-ended protrusions 275 and 175.

Figure 6:
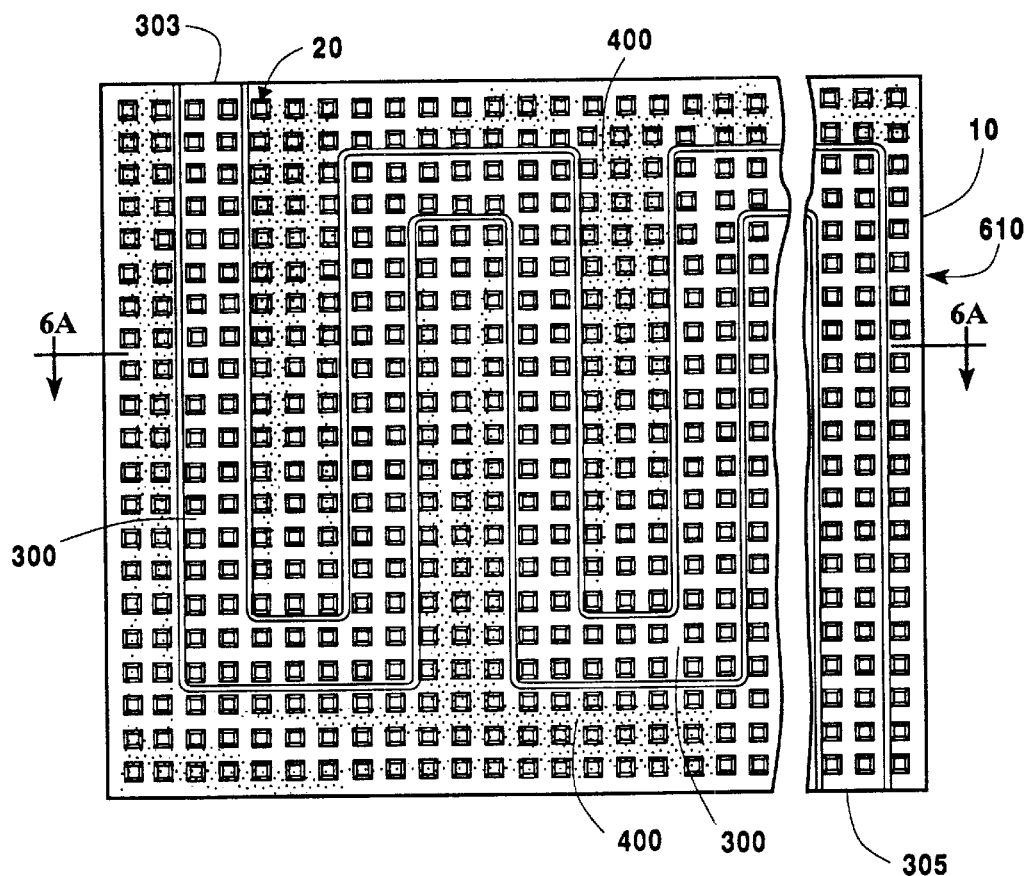
FIG. 6 is a top plan view of an article formed of the sheet material of FIG. 1 having a continuous open-top groove formed in its upper surface in accordance with the present invention.
Figure 6:
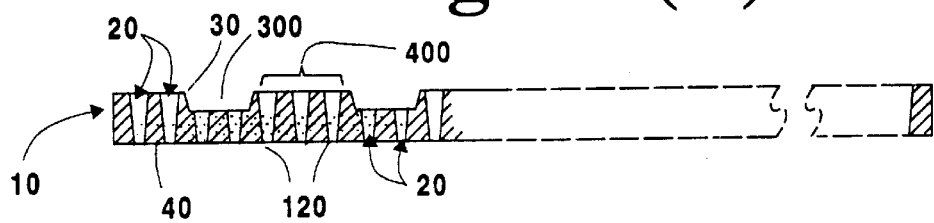
Figure 6:
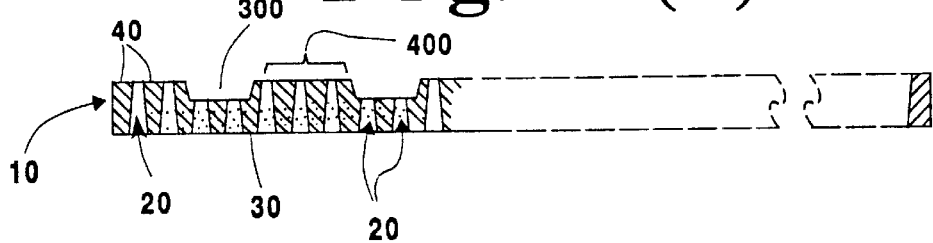

In the practice of the present invention, with reference to FIGS. 6 and 6(A), a gas permeable flexible graphite sheet 10, having transverse channels 20, as shown in FIG. 1, is provided, at its upper surface 30 with a continuous, open groove 300, fluid inlet 303 and fluid outlet 305 to constitute a gas diffusing electrode 610. FIG. 6(B) shows an alternative arrangement wherein the open groove 300 is provided in the opposite surface 40. The groove 300 of the present invention is suitably formed by pressing a hard metal die onto flexible graphite sheet material of the type shown in FIG. 2, i.e., flexible graphite sheet having transverse channels 20 passing therethrough between surface 30 and surface 40. The die forms a continuous open groove 300 in the surface contacted by the die and, for a sheet of flexible graphite 0.006 in. to 0.125 inches thick, is suitably 0.003 inches to 0.115 inches deep and 0.020 inches to 0.250 inches wide separated by raised portions 400 e.g. 0.010 inches to 0.060 inches wide.

Figure 7:
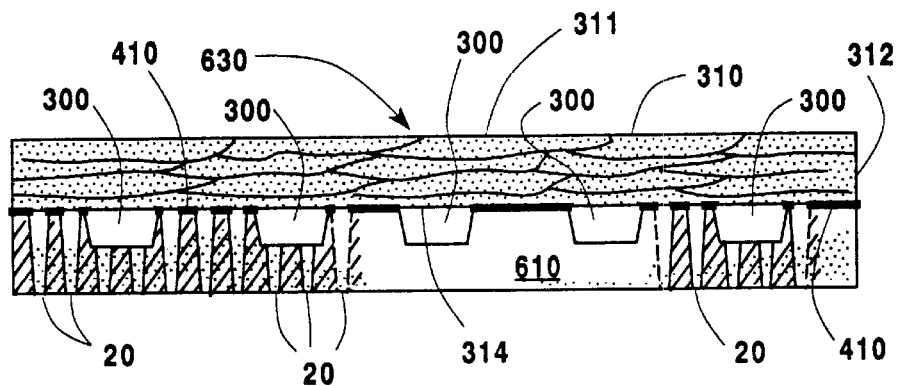
FIG. 7 shows the sheet material of FIG. 6 having a channel covering element.
Figure 8:
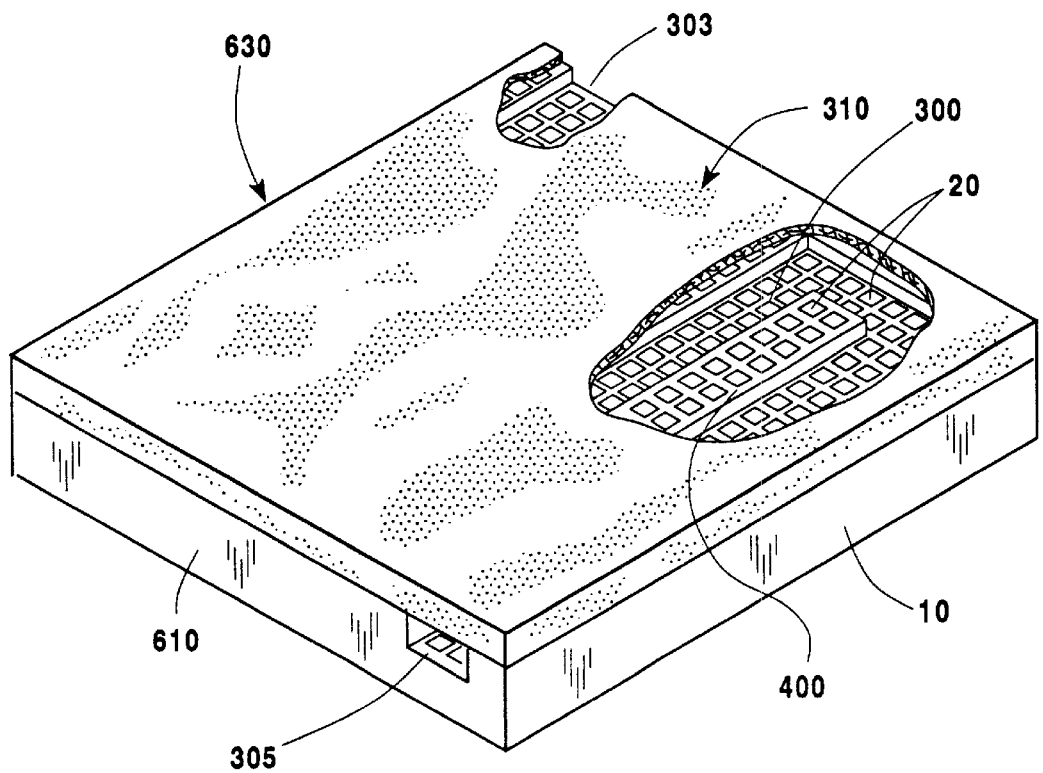
FIG. 8 is a partially fragmented perspective view of the material of FIG. 7.

The device shown in FIGS. 7 and 8 is an electrode 630 in the form of a combination of a grooved gas permeable body of flexible graphite 610 with a flexible graphite cover element 310.

Cover element 310 shown in FIGS. 7 and 8 is a thin flexible graphite sheet (0.003 inches to 0.010 inches) that has been roll pressed and calendered to a relatively high density, e.g 0.9. to 1.5 g/cc. The roll pressed and calendered sheet 310 has a very high degree of anisotropy with respect to thermal conductivity. The thermal conductivity in directions in the plane of the flexible graphite sheet ("a" direction) is typically 30 to 70 times the thermal conductivity in the direction through the flexible graphite sheet ("c" direction). Consequently, heat generated in the fuel cell 500 shown in FIGS. 9, 10, 10(A), e.g. at catalyst 603, due to electric current flow, is conducted through gas diffusing electrode 610 to the abutting and contiguous flexible graphite sheet covering element 310 and then rapidly conducted, parallel to the opposed surfaces 311, 314 of the graphite sheet 310, due to high heat conductivity in this direction ("a"), to the edges 312 of flexible graphite sheet cover element 310, where the heat can be readily dissipated by convection. The need for incorporating cooler cells, or elements, in a stack of fuel cells is thus minimized.

In order to achieve optimum bonding between flexible graphite sheet cover element 310 and gas diffusion electrode 610, graphite sheet cover element 310 is impregnated with a thermosetting resin (e.g. by immersion in a solution of modified phenolic resin in alcohol) and the resin containing flexible graphite sheet 30 is placed in contact with the raised portion 400 of grooved surface 30 or 40, of gas diffusion electrode 610 and heated to cure the resin and form a bond 410 at the lands 400 of the grooved surface. This is conveniently accomplished by placing the resin impregnated cover element 310 on a flat metal surface and lightly pressing the gas diffusion electrode 610 against the resin impregnated cover element 310 while heating the cover element 310 to a temperature sufficient to cure the resin and effect bonding, typically 170° C. to 400° C. Alternatively, bonding can be accomplished by coating the raised portions 400 of the die formed grooved surface of the gas diffusion layer with a similar resin and bonding and curing the cover element in place as previously described.

Figure 9:
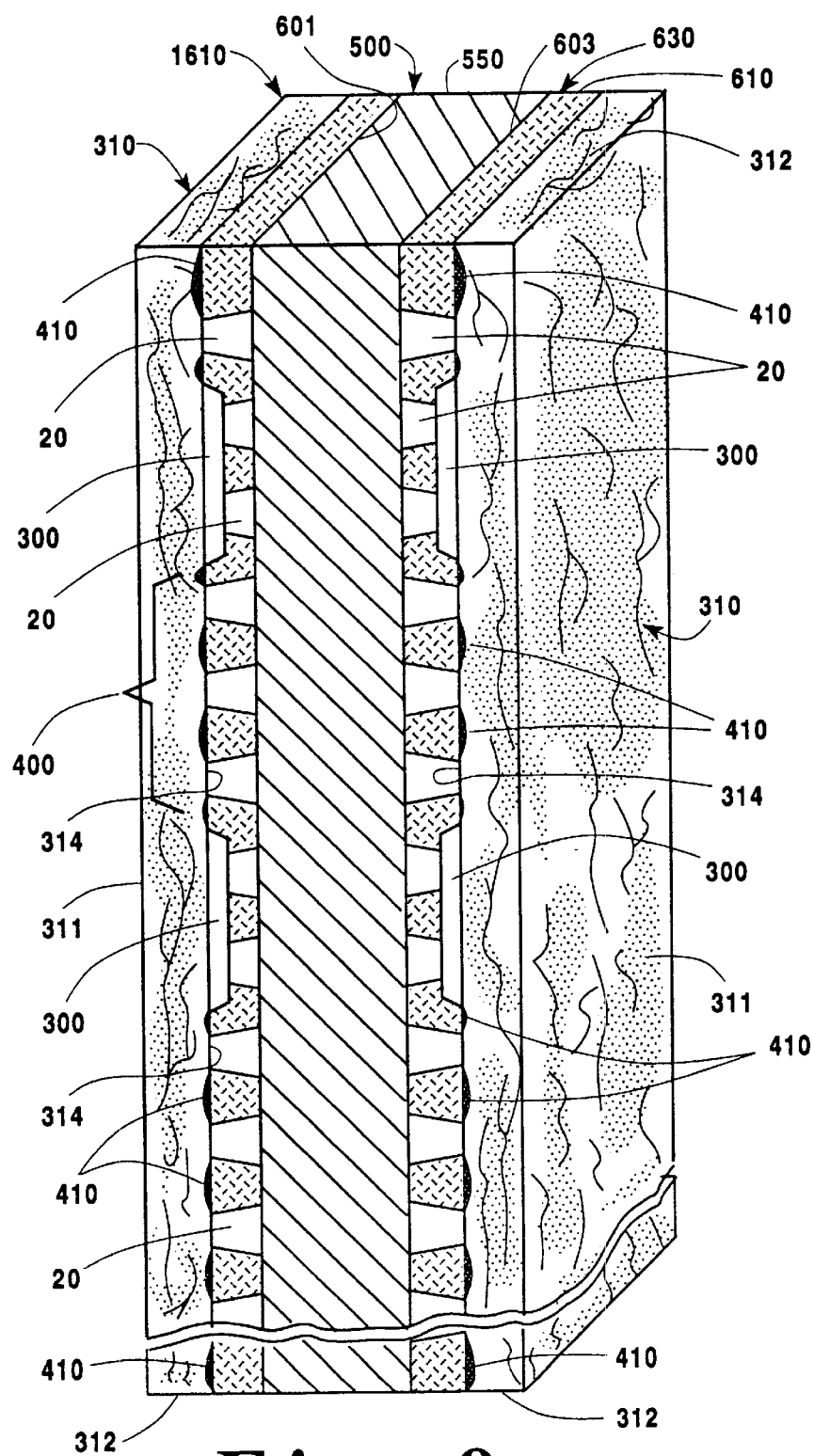
Figure 10:
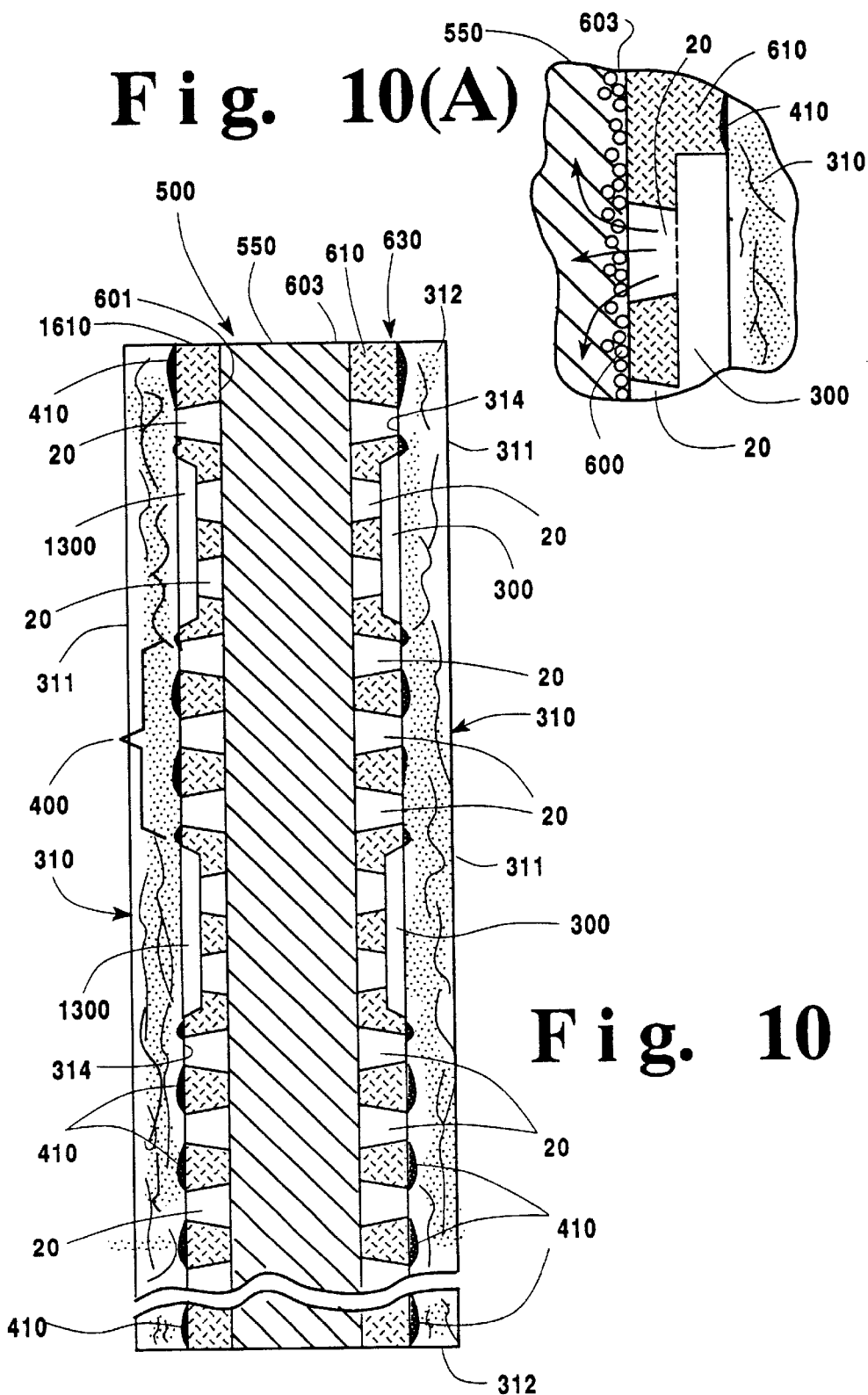

FIG. 9, FIG. 10 and FIG. 10(A) show, schematically, the basic elements of an electrochemical Fuel Cell 500, more complete details of which are disclosed in U.S. Pat. Nos. 4,988,583 and 5,300,370 and PCT WO 95/16287 (Jun. 15, 1995) and each of which is incorporated herein by reference.

With reference to FIG. 9, FIG. 10 and FIG. 10(A), the Fuel Cell indicated generally at 500, comprises electrolyte in the form of a plastic e.g. a solid polymer ion exchange membrane 550 catalyst coated at surfaces 601, 603, e.g. coated with platinum 600 as shown in FIG. 10(A) and a perforated and surface grooved flexible graphite sheet 610 in combination with cover element 310. Pressurized fuel is circulated through groove 300 of gas diffusing electrode 610 and pressurized oxidant is circulated through groove 1300 of gas diffusing electrode 1610. In operation, the gas diffusing electrode 610 becomes an anode and the gas diffusing electrode 1610 becomes a cathode with the result that an electric potential, i.e. voltage, is developed between the anode 610 and the cathode 1610. The above described electrochemical fuel cell is combined with others in a fuel cell stack to generate electric current and provide the desired level of electric power as described in the above-noted U.S. Pat. No. 5,300,370.

In the operation of Fuel Cell 500, the electrodes 610, 1610 are porous to the fuel and oxidant fluids, e.g. hydrogen and oxygen, adjacent to the ion exchange membrane to permit these components to readily pass from the surface groove 300 and channels 20 to contact the catalyst 600, as shown in FIG. 10(A), and enable protons derived from hydrogen to migrate through ion exchange membrane 550. In the gas permeable electrodes 610, 1610 of the present invention, transverse channels 20 are positioned adjacent surface grooves 300, 1300 of the electrode 610, 1610 so that the pressurized gas from the surface grooves 300, 1300 passes through and exits channels 20 and contacts the catalyst 600.

Figure 6C:
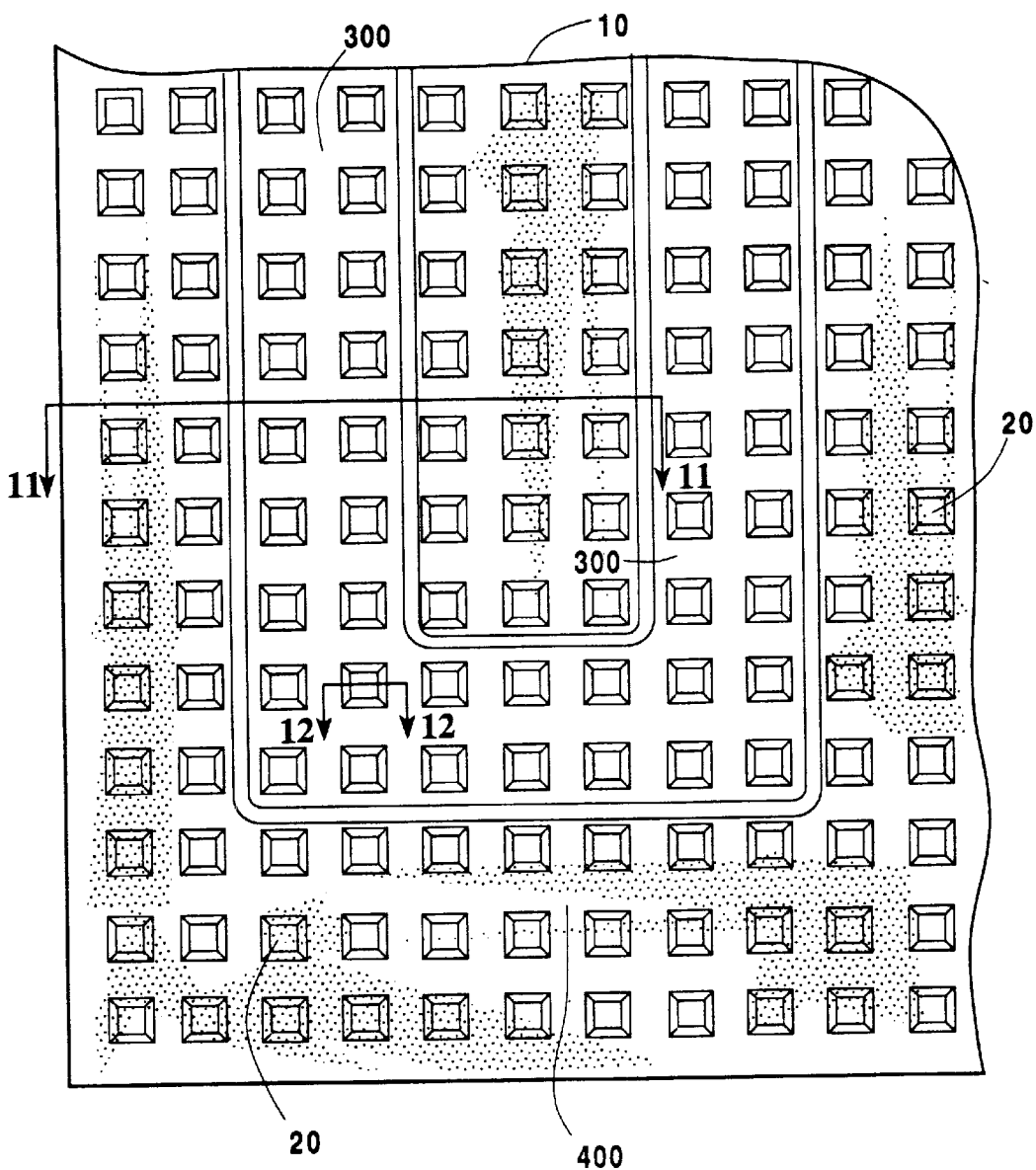
FIG. 6(C) is a top plan view of a position of FIG. 6 showing generally the location of the section views of the photographs of FIGS. 11 and 12.
Figure 11:
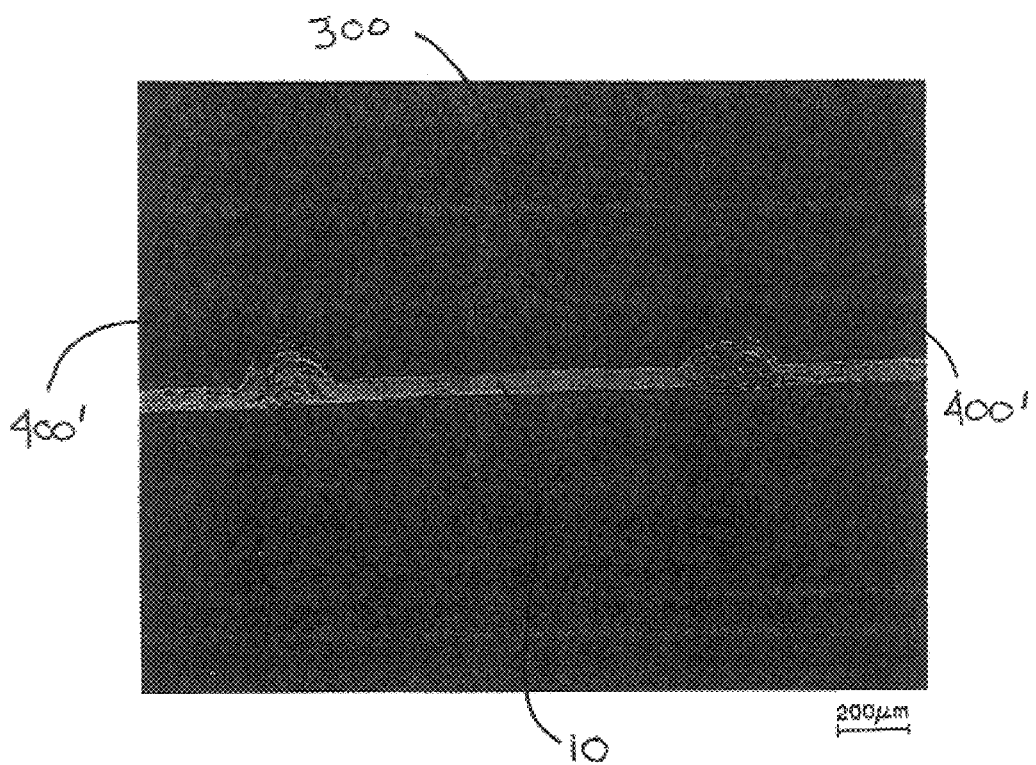
FIG. 11 is a photograph at 50× (original magnification) showing a cross-section of an open-top groove formed in flexible graphite sheet material of the type shown in FIG. 6.
Figure 12:
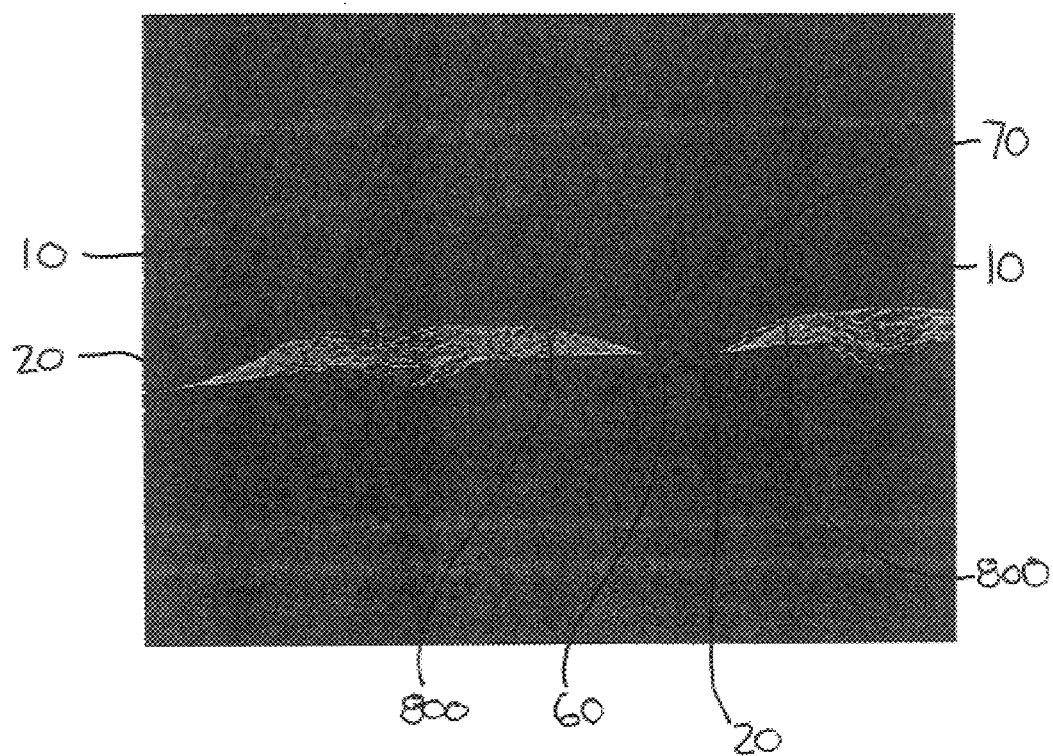
FIG. 12 is a photograph at 50× (original magnification) showing a side elevation cross-section of a transverse channel in a groove of flexible sheet material of the type shown in FIG. 6.

FIG. 11 is a photograph (original magnification 50×) showing the cross-section of a groove 300 in flexible graphite sheet 10. Transverse channels 20, shown in the cross-section of the photograph (50×) of FIG. 12, do not appear in FIG. 11 since the cross-section of FIG. 11 was taken between channels 20. Similarly, groove 300 does not appear in FIG. 12. FIG. 12 does show, at 800, the disruption of the original parallel orientation of the compressed expanded graphite particles. The general location of the cross-sections in the test samples of FIGS. 11 and 12 is shown in FIG. 6(C). The raised portions 400' in FIG. 11 are narrower than raised portions 400 shown in the drawing of FIG. 6(C).

The articles of FIGS. 6, 6(A) and 6(B) and the material shown in the photographs of FIG. 11 and 12 can be shown to have increased thermal and electrical conductivity in the direction transverse to opposed parallel, planar surfaces 30, 40 as compared to the thermal and electrical conductivity in the direction transverse to surfaces 130, 140 of prior art material of FIG. 4 in which particles of expanded natural graphite unaligned with the opposed planar surfaces are not optically detectable.

A sample of a sheet of flexible graphite 0.01 inch thick having a density of 0.3 grams/cc, representative of FIG. 4, was mechanically impacted to provide transverse channels of different size and also an open-top groove in the flexible graphite sheet. Grooves were impressed at loadings of 2500 and 3750 pounds per square inch to give increasing depth and definition to the grooves and raised portions, respectively. The transverse gas permeability of grooved and transversely channeled flexible graphite sheet samples, in accordance with the present invention, was measured, using a Gurley Model 4118 for Gas Permeability Measurement.

Samples of grooved and transversely channeled flexible graphite sheet in accordance with the present invention, and an ungrooved reference sample, were tested by being placed at the bottom opening (⅜ in. diam.) of a vertical cylinder (3 inch diameter cross-section). The cylinder was filled with 300 cc of air and a weighted piston (5 oz.) was set in place at the top of the cylinder. The rate of gas flow through the samples was measured as a function of the time of descent of the piston and the results are shown in the table below.

| | Flexible Graphite Sheet (originally 0.008 inch thick; density = 0.5 gms/cc) | | |
|---|---|---|---|
| Test Samples | 1200 Channels Per Square Inch No Groove | 1200 Channels Per Square Inch Groove Pressed at 2500 psi. | 1200 Channels Per Square Inch Groove Pressed at 3750 psi. |
| Diffusion Rate - Seconds | 3.8 | 12.8 | 18.4 |

In the present invention, for a flexible graphite sheet having a thickness of about 0.003 inch to 0.015 inch adjacent the channels and a density of about 0.5 to 1.5 grams per cubic centimeter, the preferred channel density (or count) is from about 1000 to 3000 channels per square inch and the preferred channel size is a channel in which the ratio of the area of larger channel opening to the smaller is from about 50:1 to 150:1; the open-top groove is preferably about 0.020 to 0.125 wide and at least about half the thickness of the sheet.

In the practice of the present invention, flexible graphite sheet can, at times, be advantageously treated with resin and the absorbed resin, after curing, enhances the moisture resistance and handling strength, i.e. stiffness of the flexible graphite sheet. Suitable resin content is preferably about 20 to 30% by weight, suitably up to about 60% by weight.

Particular advantages of the present invention when used in a fuel cell are high thermal dissipation at the periphery of the electrode, which minimizes the requirement for cooling elements in the cell, as well as a providing a relatively thin electrode and elimination of the need for one or both flow field plates.

The above description is intended to enable the person skilled in the art to practice the invention. It is not intended to detail all of the possible variations and modifications which will become apparent to the skilled worker upon reading the description. It is intended, however, that all such modifications and variations be included within the scope of the invention which is defined by the following claims. The claims are intended to cover the indicated elements and steps in any arrangement or sequence which is effective to meet the objectives intended for the invention, unless the context specifically indicates the contrary.

What is claimed is:

1. A graphite article comprising a compressed mass of expanded graphite particles in the form of a sheet having opposed first and second surfaces, the sheet having a plurality of transverse fluid channels passing therethrough between its first and second opposed surfaces, one of the opposed surfaces having formed therein an open groove which communicates with a plurality of the transverse fluid channels; and wherein the open groove is formed by mechanically impacting a surface of the sheet to displace graphite within the sheet so that the open groove has continuous walls defining a distinct passage across the surface of the sheet.

2. The article of claim 1 wherein the channels are formed by mechanically impacting the first surface of the sheet at a plurality of locations to displace graphite within the sheet at the locations and provide the channels with openings at both of the first and second opposed surfaces.

3. The article of claim 1 wherein the open groove is provided with a cover in the form of a flexible graphite sheet bonded to the surface in which the groove is formed.

4. The article of claim 3 wherein the open groove is provided with a cover in the form of roll pressed and calendered flexible graphite sheet bonded to the surface in which the groove is formed.

5. An electrode comprising (i) a compressed mass of expanded graphite particles in the form of a sheet having opposed first and second surfaces, the sheet having a plurality of transverse fluid channels passing therethrough; one of the opposed surfaces having formed therein an open groove having continuous walls defining a distinct passage across the surface of the sheet, which open groove communicates with a plurality of the transverse fluid channels and (ii) a sheet of flexible graphite bonded to the surface in which the groove is formed to provide a cover therefor.

6. The electrode of claim 5 wherein the channels are formed by mechanically impacting the first surface of said sheet at a plurality of locations to displace graphite within sheet and provide the channels with openings at both of the first and second opposed surfaces.

7. The electrode of claim 5 wherein the channels are formed by mechanically impacting the first surface of the sheet at a plurality of locations to displace graphite within the sheet at the locations and provide the channels with openings at both of the first and second opposed surfaces.

8. The electrode of claim 5 wherein the open groove is provided with a cover in the form of a flexible graphite sheet bonded to the surface in which the groove is formed.

9. The electrode of claim 8 wherein the open groove is provided with a cover in the form of roll pressed and calendered flexible graphite sheet bonded to the surface in which the groove is formed.

10. The electrode of claim 5 wherein the open groove is formed by mechanically impacting a surface of the sheet to displace graphite within the sheet.

* * * * *